Nov. 17, 1964 W. S. BUSLIK 3,157,868

WEAR RESISTANT PRESSURE PAD

Filed Jan. 6, 1960 3 Sheets-Sheet 1

INVENTOR

WALTER S. BUSLIK

BY Sughrue Rothwell Mion and Zinn

ATTORNEYS

Nov. 17, 1964 W. S. BUSLIK 3,157,868

WEAR RESISTANT PRESSURE PAD

Filed Jan. 6, 1960 3 Sheets-Sheet 2

3,157,868

WEAR RESISTANT PRESSURE PAD

Walter S. Buslik, Poughkeepsie, N.Y., assignor to International Business Machines Corporation, New York, N.Y., a corporation of New York Filed Jan. 6, 1960, Ser. No. 891
16 Claims. (Cl. 340—174.1)

The present invention relates to improvements in transducing apparatus for data processive equipment and, more particularly, to an improved, wear resistant, pressure pad associated with a transducer head assembly.

Present day electronic computing equipment is characterized by its high speed of operation. One of the more common data handling expedients in the data processing field has been to record information on individual, relatively small, uniform documents which may be easily transported, read, sorted and stored. The information may be placed on the documents by one of many methods, such as perforating the documents with the perforations being formed within the document according to a particular code allowing the storage of a great deal of information within a small area, or by the relatively new process of ferro-magnetic printing on uniform documents. The ferro-magnetic printing process includes producing a visible and magnetized image of a desired character on a non-magnetic base such as paper, i.e., printing paper documents with magnetic ink characters so that the characters can be read by both persons and machines.

The present invention is particularly applicable to documents containing ferro-magnetic information in which the information may be recorded or read by suitable ferro-magnetic transducer heads positioned so as to contact the surface of the document carrying the ferro-magnetic printing. However, the invention is not limited to such apparatus and may be generally employed in electronic data processing equipment making use of magnetic transducers wherein a plurality of non-continuous documents are passed by the transducer at relatively high speed.

When non-continuous documents are fed by a transducer head at relatively great velocity, it is essential that each document be pressed firmly against the transducer head with equal pressure on portions of the recorded surface contacting the head to enable the information to be read by the transducer with minimum distortion. In order to provide sufficient pressure, pressure pads have been utilized in the past for forcing a moving non-continuous document against the surface of the transducer head while allowing the documents to move at relatively great speed between the transducer head and pressure pad. In apparatus of this type, it is apparent that when dealing with non-continuous documents such as business cards and the like, there are times when the pressure pad is in direct contact with the surface of the transducer head prior to the transducer head and the pressure pad receiving the next succeeding document. With the pressure pad in contact with the transducer head, in order to pass a record therebetween the pressure pad must be moved away from the surface of a transducer head to allow the high velocity document to pass by the surface of the transducer head in contact therewith. In the known prior art, the transducer head is held stationary and the pressure pad allowed to move away from the surface of the transducer a sufficient distance so that the document could pass therebetween. Because of the relatively large friction forces involved, a large amount of wear on the pressure pad occurs during a relatively short period of time. As a result, replacement of the pressure pad is needed after only a few hours of operation, requiring the machine with which the transducer heads are associated to be shut down, and in some cases, the replacement of the pressure pads is made only with considerable time and difficulty.

In addition, the prior art pressure pads generally consist of a movable element which is biased toward the transducer head with the contact surface of the pressure pad generally consisting of a rectangular block or the like. Because of the particular configuration, and because of the large number of document passes, there is resulted uneven wear upon the surface of the pressure pad, causing unequal pressures to be exerted on the documents as they passed between the pressure pad and the transducer head. Ultimately, this uneven wear resulted in distorted pick up signals by the transducer head from the surface of the moving documents.

Because of the frequency with which the documents are moved past the transducer head, and because of the initial impact of the front edge of the document with the transducer head and the pressure pad, there occurs considerable destruction to the documents which results in the formation of a sufficient amount of document dust to cause fouling of the transducer head and the movable pressure pad associated therewith.

It is therefore an object of this invention to provide an improved transducer head and pressure pad assembly for receiving high velocity, non-continuous documents in which the pressure pad has greatly improved wearing qualities.

It is a further object of this invention to provide an apparatus of this type in which the pressure pad is provided with means for automatically changing the contact surface with resulting evenness in wear.

It is a further object of this invention to provide an improved apparatus of this type in which the line of contact between the pressure pad, the document and the transducer head remains in the same position, regardless of the amount of wear on the pressure pad.

It is a further object of this invention to provide a wear resistant pressure pad or apparatus of this type in which the cost of manufacturing the pressure pad is greatly reduced and in which an economical and easy replacement of the wearing element of the pressure pad is achieved.

It is a further object of this invention to provide an improved wear resistant pressure pad for a transducer head wherein the pressure pad has incorporated therein means for assuring that the area surrounding the pressure pad, the document and the transducer head is kept clear of document dust and the like.

Other objects of this invention will be pointed out in the following detailed description in the claims and illustrated in the accompanying drawings which disclose, by way of example, the principle of this invention and the best mode which has been contemplated of applying that principle.

In general, the apparatus of this invention includes a transducer head which may be of a magnetic type having a flattened forward contact surface or face. A plurality of spaced, noncontinuous documents such as magnetic information bearing cards are adapted to move linearly at high velocity past the flattened surface of said transducer head. A wear resistant pressure pad is provided for holding the documents against the flattened contact surface of the transducer head. The pressure pad includes a movable member, such as a roller, biased toward the surface of the transducer to force the record cards against the transducer at a single line of contact axially of the roller. Friction means are provided to act upon the rotatable roller and to prevent the roller from rotating except at the time of impact of another document entering the area between the transducer and pressure pad. After this initial impact the friction means exert a greater holding force than the moving force caused by friction between the moving card and the pressure pad roller at the line of contact to thereby hold the roller stationary until the impact of the leading edge of the next card causes the roller to again rotate slightly. Thus wear on the roller is evenly distributed. The biasing means may be air pressure, and the leakage of the pressure is utilized to keep the pressure pad assembly clear of document dust. More particularly, in one form of the invention the pressure pad comprises a reciprocable block member positioned adjacent the flattened contact surface of the transducer head at right angles thereto, with means biasing the block member toward said head. The block member includes a V-shaped recess formed on the forward surface thereof facing the head with the bisector of the angle of V surfaces located on a line perpendicular to the flattened contact surface. A rotatable roller is positioned within the V-shaped recess with the roller having line contact with each side of the V-shaped recess and the transducer head. By this arrangement the wear on the roller will be even and as the roller wears it will still force the documents against the transducer along the same line of contact extending axially of the roller. In another embodiment the roller is in operative relationship to the documents through a movable belt.

Figure 1:
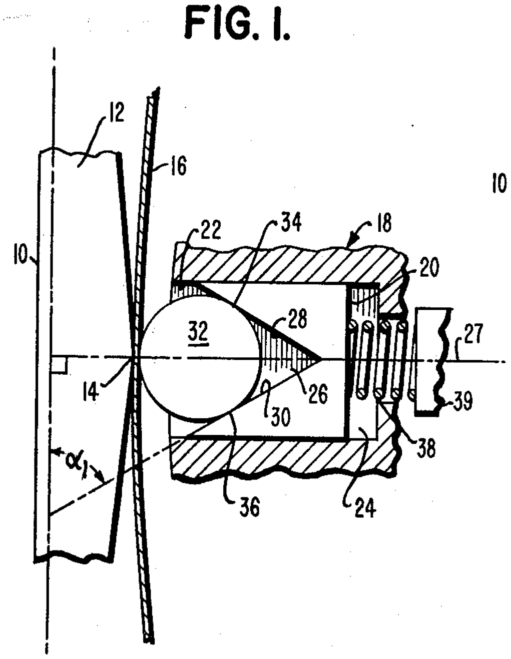
FIGURE 1 is a schematic side view of the transducer head and wear resistant pressure pad assembly embodying the principles of this invention.

Referring to FIGURE 1 of the drawing, there is shown one embodiment of the present invention including a transducer head 10, which may, for convenience, be a magnetic transducer head, provided with a relatively flattened contact surface 12, the contact surfaces being inclined backwards slightly as indicated, forming a central line of contact 14 between the transducer head 10 and a moving non-continuous information bearing document 16 shown as being positioned against the surface of the magnetic head. In order to insure that the moving, non-continuous document 16 is firmly pressed against the surface of the transducer along the line of contact 14, there is provided a pressure pad assembly 18. (The line of contact 14 appears as a point in the side view of FIGURE 1 as it extends longitudinally of roller 32.)

The pressure pad assembly 18 includes a block member 20 which is positioned between suitable support members 22 and 24 and is slidable thereon so as to move toward and away from the document and the magnetic head 10. The block member 20 has formed at the forward face thereof, a V-shaped recess 26 with the jointure of the V being directed towards the rear of the block and having the upper and lower sides 28 and 30, respectively, meeting at an apex of the V on a line 27 through the line of contact 14 and perpendicular to the face of the magnetic transducer head. Line 27 bisects the V-shaped recess 26. The V-shaped recess 26 is adapted to freely receive a roller member 32. The roller 32, when positioned within the V-shaped recess 26 and when sufficient pressure is exerted on the rear surface of block member 20, will have line contact with the sides 28 and 30 of the V-shaped recess at points 34 and 36 respectively while contacting the document or the magnetic head along line of contact 14 extending axially of roller 32. As shown schematically, a coil spring 38 acting between stationary abutment 39 and V block 20, provides sufficient biasing force to keep the roller against the surface of the moving document 16 or against the head 10 during the period subsequent to the passage of one document and prior to the entry of the next succeeding document.

From FIGURE 1, the simplified diagrammatic sketch of the pressure pad forming the present invention, it is apparent that the line of contact between the magnetic head, the document and the pressure pad will remain the same regardless of the amount of wear or the decrease in diameter of the roller member 32, unless of course, there is uneven wear on the roller member. For instance, should the roller member wear evenly to any extent, it is apparent that the contact lines 34 and 36 on the sides of the V-shaped recess will simply move uniformly deeper within the V-shaped recess while the contact line 14 between the document and the roller will remain the same. The biasing force will in this case simply move the block 20 towards the magnetic head 10 to achieve such a result.

As the high velocity document moves past the magnetic head and in contact with the surface of the roller along contact line 14, there will be of course, some wear between the document and the magnetic head since the magnetic head will remain stationary. However, the relative movement of the document and the roller and the wear between said elements will be determined by the frictional characteristics of the document, the roller and the V-shaped block.

It has been determined by experimentation, that the minimum amount of wear will occur when certain conditions are met relating to the proper design of the friction angles at contact lines 34 and 36 as well as a desired co-efficient of friction between the various materials makig up the assembly. Not only the minimum amount of wear, but uniform wear of the complete peripheral surface of the roller will occur, when the co-efficient of friction and the friction angles of the V supporting block 20, the roller 32 and the document characteristics are such that the friction forces developed between the V block and the roller are greater than the friction forces developed between the moving document and the roller as the moving document moves across the transducer head. However, because of the requirement for uniform wear on the peripheral surface of the roller, it is apparent that the roller should be moved slightly to achieve continuous change in the surface area of contact between the roller and the document or the transducer head.

Ideally, it has been found that because of the use of non-continuous documents, there will occur a variation in the friction forces at the time of impact of the oncoming document with the magnetic transducer head and the peripheral surface of the roller. When the end of the document 16 moves in between the magnetic head 10 and the roller 32, in contact at this instant, the roller being relatively movable along with the V-shaped supporting block 20 allows the moving document to force it to move away from the magnetic head allowing the document to pass. It is at the instant when the leading edge of the document contacts the roller and magnetic head that the frictional forces, between the roller 32 and the sides 28 and 30 of the V-shaped recess 26 within the block 20, are overcome by the frictional force developed between the document 16 and the roller 32 such that momentarily there is no relative movement between the edge of the moving document and the peripheral surface of the roller, causing a slight rotational movement of the roller 32 within the V block 20. Thus the roller rotates bit by bit in small increments about its axis while in contact with the sides of the V-shaped recess 26, but this slight rotation is overcome after the initial impact and as soon as the document is positioned between the roller 32 and the magnetic head 10.

After the instant of impact with the document moving at its relatively large speed past both the magnetic head and the roller, there is no longer any rolling of the pressure pad roller 32 on the document 16 and the forces acting on the roller by the movement of the document are insufficient to overcome the frictional resistance of the roller within the V block, thus the document slides with respect to the surface of the roller.

Therefore, the greatest deterrent to rapid wear of the roller is the fact that the roller rotates slightly with respect to the document at the time of initial impact. Subsequent sliding between the document and the roller, will cause some wear to the roller, but this is infinitesimal when compared to the wear normally caused by the initial impact of the documents against the pressure pads which are unable to move momentarily along with the documents.

At the same time the momentary rotation of the roller with respect to the V-shaped supporting block constantly presents a new roller surface at the face of the transducer head insuring uniform wear throughout the peripheral surface of the roller.

In order to more fully appreciate the operation of the present system employing the pressure pad shown in FIGURE 1, it is necessary to understand how the friction angles of the various contact points of the roller with the V-shaped supporting block and the moving card may be varied and the requirements for initially setting these friction angles within a desired range. Assuming there is a body in contact with a particular surface and there is a force of any constant magnitude applied to the body such that its line of action intersects the point of contact between the body and the surface upon which it rests, the force will make an angle with a line drawn normal to the contact surface at this point. As the angle is increased, a situation will result wherein the body begins to slide on the surface. When this occurs, the angle becomes the friction angle which is a function of the two materials in contact at the point.

Figure 2:
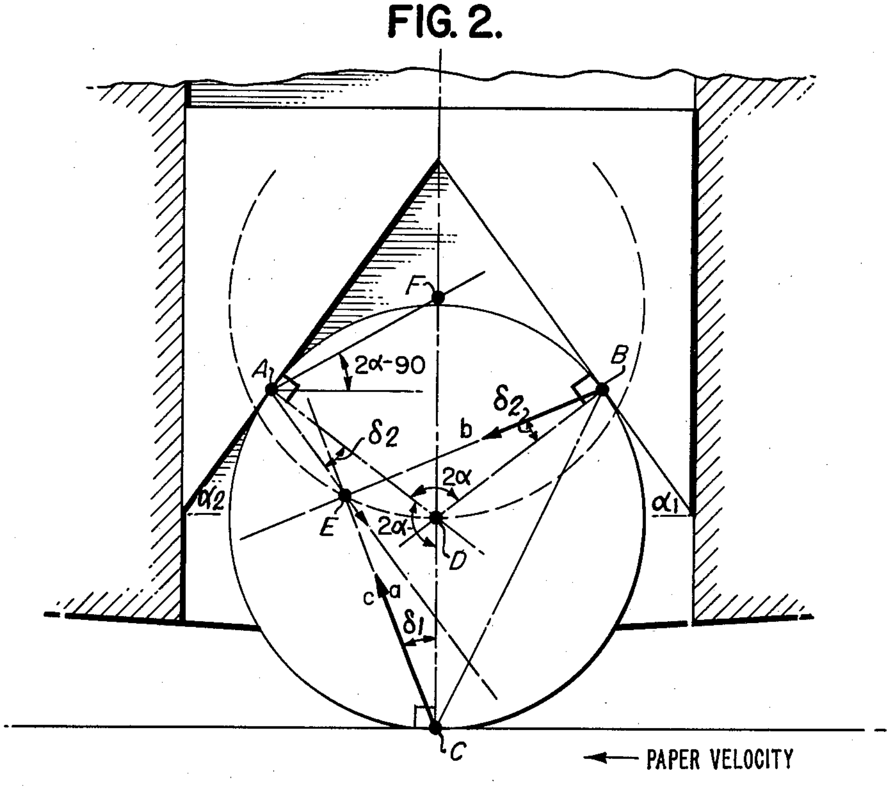
FIGURE 2 is a geometrical showing of the pressure pad for illustrating the friction angles and reaction forces at the contact points of the roller.

Referring to FIGURE 2, there is shown geometrically the roller 32 positioned within the V block 20 with the roller making frictional contact at points A and B of the block's surface and at point C with the document or transducer head. Lines AD, BD and CD are the normals at the contact points A, B and C. Assuming that certain forces are acting at points A, B and C, these forces are shown vectorially as arrows $a$, $b$ and $c$ which are the reactions exerted on the roller at the contact points as the documents slide past point C from right to left. If we assume under these conditions that the friction angle at C to be $\delta_1$, then the sliding of the roller at points A and B is opposed by the frictional forces at A and B. As long as the friction angles at points A and B are not exceeded, sliding will not occur. Since the materials making contact at A and B, are the same, the friction angles at points A and B are the same and are designated as $\delta_2$. Under these circumstances, if the roller is to be in equilibrium, that is stationary at points A and B with the paper sliding at point C, then the reactions at points A, B and C must intersect at a point designated as E and must add up to zero vectorially. The locus of point E (that is the intersection of the friction angles at A and B) for any variation in the friction angles at these points is a circle passing through A and B with its center at F.

It is readily apparent that if the friction angle $\delta_1$ becomes larger, then friction angle $\delta_2$ must also increase for the point E on the circle defined by locus F to move toward A. By varying the friction angles $\delta_1\delta_2$ and by setting up certain conditions involving these friction angles as well as the angle $\alpha$ which is defined as the angle between the tangent of the roller at point C and an extension of one of the sides of the V-shaped block, the necessary conditions to achieve equilibrium may be obtained. In the embodiment shown in FIGURES 1 and 2, with the V block positioned at right angles to the transducer face the extensions from the sides of the V block will make angles $\alpha_1$ and $\alpha_2$ respectively with the tangent to the roller at point C. In this case the angles $\alpha_1$ and $\alpha_2$ are equal. Assuming hypothetically a condition, case I where the friction angle $\delta_1$ is greater than $\alpha/2$, with the sub-condition that the friction angle $\delta_1$ plus the friction angle $\delta_2$ is less than $\alpha$, there will result a situation in which the forces $a$, $b$ and $c$ cannot intersect at one point. The resultant of $a$ and $b$ is a force equal and opposite to $c$ but acting through point E with the force $c$ to the left of point E. The result is a clockwise moment with the roller tending to roll out along the left V-block surface. However, because the component of $c$ along that surface is greater than that of $a$, the roller will start to slip at A and begin to spin. This is an undesirable condition for sustained operation.

Likewise, assuming a new case II, which is similar to case I in that $\delta_1$ is greater than $\delta_2$, but in this case friction angle $\delta_1$ plus friction angle $\delta_2$ is greater or equal to $\alpha$, the forces $a$, $b$ and $c$ again cannot intersect at one point, a clockwise moment is set up with the roller having a tendency to roll at point A, but unlike case I, the component of $c$ is less than the component of $a$ and no slipping will occur. Rolling continues with the result that there is a tendency for the roller to roll or "walk out" of the V block and this is also an undesirable condition.

If arbitrarily there occurs another situation designated as case III where the friction angle $\delta_1$ is less than $\alpha/2$ and with the point E to the right of reaction force $c$ it is apparent that friction angle $\delta_2$ is so small that the resultant of forces $a$ and $b$ and the force $c$ again produce a clockwise moment tending to cause rotation of the roller in this direction. Again, because $c$'s component along the left face of the V block is larger than $a$'s component, slippage will occur at A and the roller will spin. Obviously this is also an undesirable condition since we require equilibrium of the roller, under normal circumstances.

By modifying case III slightly, there occurs a fourth situation designated as case IV or situation wherein the friction angle $\delta_2$ is now large enough to situate the point of intersection E of the reaction forces to the left of force $c$. The friction force may vary within the limits of friction angle $\delta_2$ and when the force assumes a smaller value, a situation may be achieved in which the point E may be located on the line of action of force $c$ and the roller is then maintained in balance and at rest. It is by now apparent, that the friction angle $\delta_1$ may be conveniently varied by selection of the roller material while the friction angle $\delta_2$ may be varied by selection of both roller and V-block material. As a result of the conditions set up in case IV, the card or document will slide on the peripheral surface of the roller at point C and an equilibrium condition is achieved. This is, of course, the desired condition and may be set forth by the following formula, by use of the reaction force diagram in which $\alpha_1=\alpha_2$ of FIGURE 2:

$$\frac{\sin \delta_2}{\cos \alpha}=\frac{\sin \delta_1}{\cos (\delta_1+\delta_2)}$$

It is possible to sum up case IV or the equilibrium condition as outlined above, by setting forth their critical conditions as follows:

Case I: $\delta_1>\frac{\alpha}{2}:\delta_2>\alpha-\delta_1$ (The roller will spin.)

Case II: $\delta_1>\frac{\alpha}{2}:\delta_2\geqq\alpha-\delta_1$ (The roller will roll about A and "walk out.")

Case III: $\delta_1\leqq\frac{\alpha}{2}$ (The roller will spin) point E is to the right of C.

Case IV: $\delta_1 \geqq \frac{\alpha}{2}$ E is to the left of $c$ (The roller is in equilibrium.)

With these four cases in mind, it is apparent that the equilibrium condition may be set up by providing the proper friction angles. For instance, since $\delta_1$ is a function of the document speed and document surface as well as the roller surface, the friction angle may be varied by varying the type of paper or material of the document. However, since generally there is less control over the type of paper or card stock used in the documents the friction angle $\delta_1$ is most conveniently controlled by selecting the roller material. At the same time, the angles $\alpha_1$ and $\alpha_2$ may also be varied.

Under the above four cases, the angle $\alpha$ is so chosen that cases I and II are avoided, that is, assurance is made that $\alpha$ is greater than two times the friction angle $\delta_1$. In order to avoid case III, the friction angle $\delta_2$ is varied so as to satisfy the condition for case IV placing E to the left of $c$. This may be conveniently done by selecting a suitable material for the V-block or for the roller. The roller is now maintained in equilibrium under steady document motion conditions, that is when the document is fully beneath the roller.

While the ideal situation occurs when the roller is prevented from sliding within the V-block as the card or document moves past the transducer, in order to obtain uniform wear on the surface of the roller, it is desirous that the roller rotate intermittently to provide a new contact surface.

Figure 4:
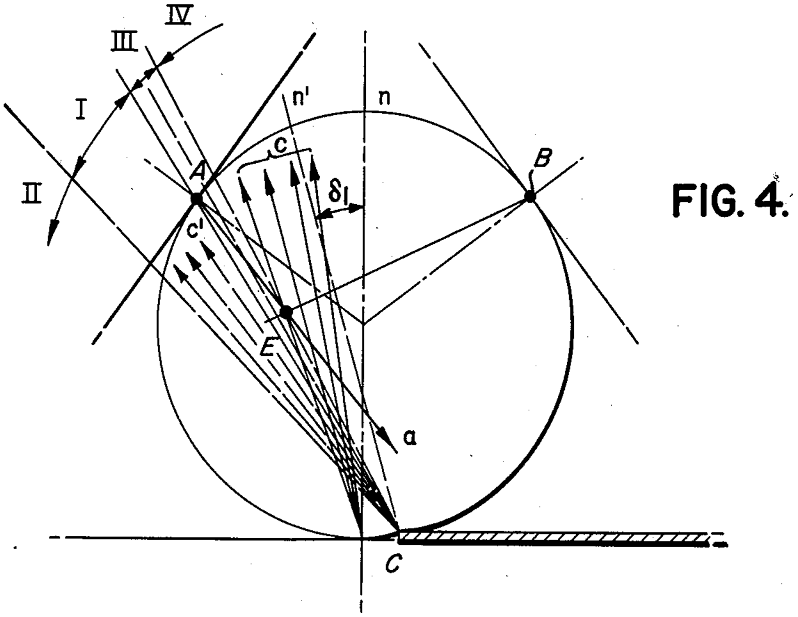
FIGURE 4 is a geometrical illustration of the pressure pad showing the friction angles and reaction forces at the contact points of the roller.

Referring now to FIGURE 4, it is indicated geometrically how the friction angle $\delta_1$ varies from the time of impact of the document with the roller to the time at which the document is fully positioned between the roller and the transducer head. With the vectors $c$ indicating the range of friction angles $\delta_1$ which will produce equilibrium while the documents are fully under the roller, it is apparent that when the leading edge of the document enters under the roller two new conditions are established. First, the normal to the roller surface at the contact point with the paper is rotated counter-clockwise from $n$ to $n'$. At the same time, it is obvious that the friction angle $\delta_1$ is increased because of the larger coefficient of friction between the relatively sharp leading edge of the document and the roller as compared to the co-efficient of friction existing between the smooth document surface and the roller under normal circumstances where the document is fully positioned beneath the roller. As a result, the new force $c'$ will be shifted to the left of intersection point E and the roller will spin momentarily as described in cases I and III.

In order to show the relative position of the reaction force $c$ in all four of the cases noted previously, FIGURE 4 shows the reaction forces $c$ and $c'$ as they occur within their appropriate ranges either to the right or to the left of the intersection point E. While it is important that we momentarily shift the reaction force $c'$ to the left of the intersection point E, it is also important that case II be avoided, that is the case where the reaction force $c$ is rotated counter-clockwise beyond the point where it is parallel to the reaction force $a$. From viewing FIGURE 4, it is apparent that although definite limits exist with respect to the friction angles, the angles may vary over a reasonable range and still achieve the desired result or equilibrium under normal conditions and allowance of spin at point A during the initial point of contact of the document with the roller to achieve uniform wear of the roller surface.

Figure 3:
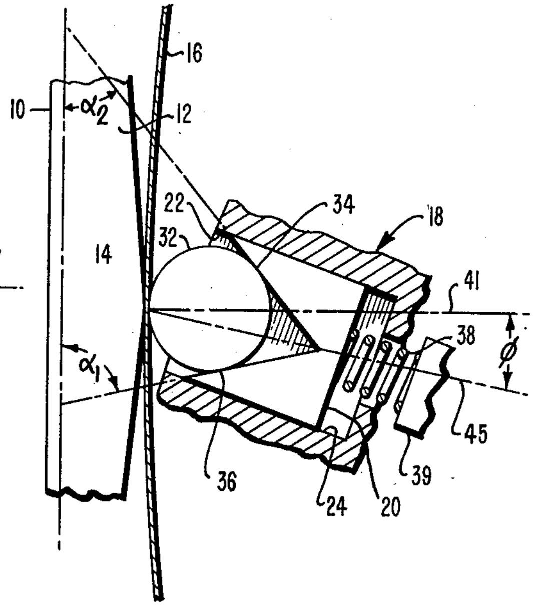
FIGURE 3 is a schematic view of the transducer head, and the wear resistant pressure pad of the present invention, with the pressure pad support apparatus having its axis inclined with respect to a line perpendicular to the face of the transducer head.
Figure 5:
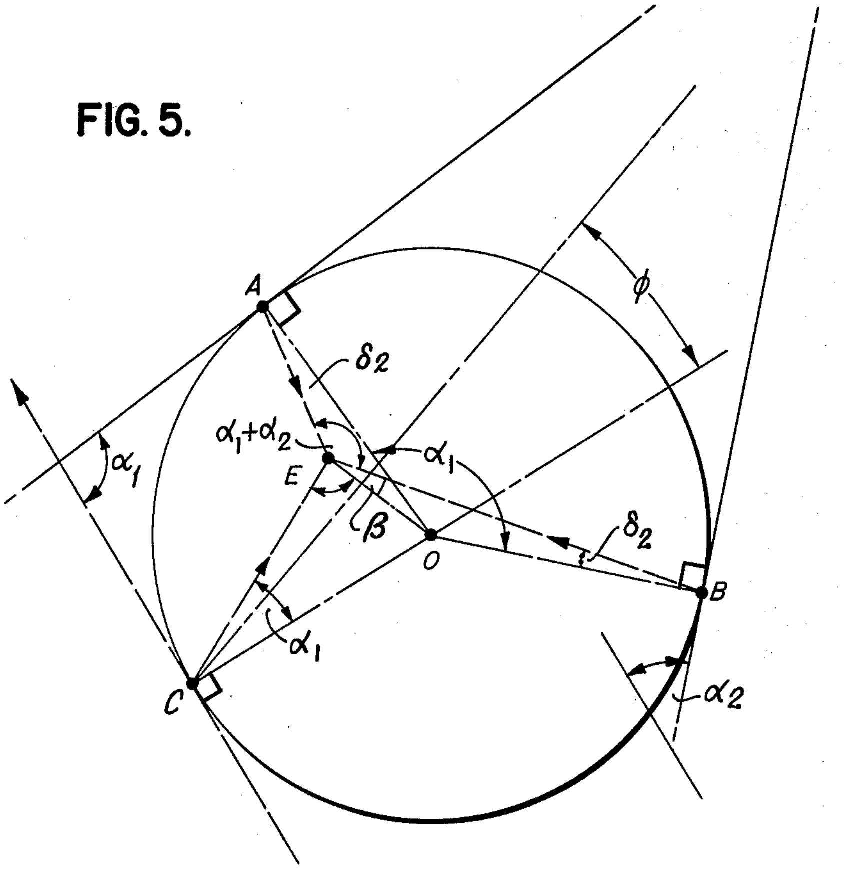
FIGURE 5 is a geometrical illustration of another embodiment of the present invention.

Since it is necessary to shift the reaction force $c$ or $c'$ to the left of the intersection point E in order to achieve slippage of the roller at point A in order to present a new contact surface to the document, and achieve uniform wear of the roller, it is possible that the reaction force $c$ will move so far to the left as to fall within the situation outlined in case II wherein the reaction force line $c$ or $c'$ moves past a position where it is parallel to the reaction force $a$ and as a result, the roller will roll about A and "walk out." In addition, if the parameters are varied such that the V-shaped recess within the block member becomes very shallow and the coefficient of friction very high, there will be a tendency for the roller 32 to roll out of the V-shaped recess 26 when the document strikes the roller in the manner outlined above. As a result, the line of contact between the forward peripheral surface of the roller and the document which normally would occur at line 14 of FIGURE 1 or point A of FIGURE 2, will move downwardly on the transducer head resulting in pressure being applied to the document at the wrong portion of the magnetic head, greatly enhancing the possibility of signal distortion.

Where such conditions occur, the tendency for the roller to roll out of the V-shaped groove may be prevented by tilting the whole assembly away from the direction in which the documents are being received as indicated in FIGURE 3. The physical components of the FIGURE 3 embodiment are the same as in FIGURE 1 and like reference numerals represent like parts. However, by merely tilting the assembly there occurs a redistribution of the frictional forces such that at the time of document impact, the roller will momentarily roll on the surface of the document and slide within the V-shaped recess. It is apparent from viewing FIGURE 3, that the situation differs slightly from that shown in FIGURE 1, in that the angles with which the sides of the V-shaped recess make with the tangent to the roller at point C will be different, that is, $\alpha_1$ and $\alpha_2$ will no longer be equal. This is of course the more general case, and the equilibrium conditions for a system wherein the support means are tilted away from the perpendicular, are set forth in the geometrical showing of FIGURE 5. Referring to this figure, it is obvious that the angles $\alpha_1$ and $\alpha_2$ are unequal, that there is thereby formed, an angle $\theta$ which is defined as the angle of inclination of the assembly, being the angle between the perpendicular to the card surface at point C and a line drawn from the contact point C through the apex of the V-shaped recess. The equilibrium condition may be set forth where unequal angles $\alpha_1$ and $\alpha_2$ are present by the following formula:

$$\frac{\sin \delta_1}{\sin \delta_2} \frac{\cos\left(\delta_1+\delta_2+\frac{\alpha_2-\alpha_1}{2}\right)}{\cos\left(\frac{\alpha_1+\alpha_2}{2}\right)}$$

This is the most general case and the formula satisfies these conditions regardless of the value of $\theta$. It is apparent from viewing FIGURE 5 that the angle $\theta$ is entirely dependent upon the original designation of angles $\alpha_1$ and $\alpha_2$. The relationship between $\theta$ and the angles $\alpha_1$ and $\alpha_2$ may be represented by the following formula for the tangent of angle $\theta$ which is as follows:

$$\tan \theta = \frac{\tan\left(\frac{\alpha_1+\alpha_2}{2}\right) - \tan \alpha_2}{\frac{1}{\cos \alpha_2} + 1 + \tan\left(\frac{\alpha_1+\alpha_2}{2}\right) \tan \alpha_2}$$

Figure 6:
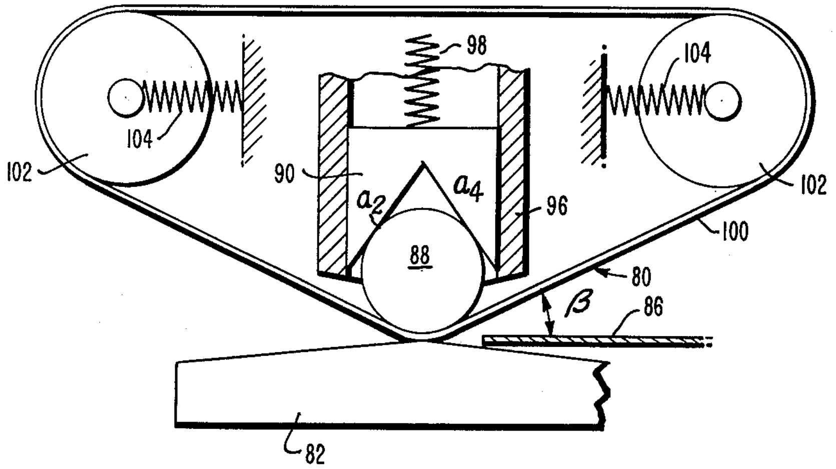
FIGURE 6 is a side elevational view of a wear resistant pressure pad forming another embodiment of the present invention.

While the pressure pad assembly shown in the embodiment of FIGURE 1 provides a greatly increased surface area which in itself greatly reduces the effect of wear on the pressure pad during the operation of the machine, the embodiment shown in FIGURE 6 provides an even greater contact surface area with a decided increase in the operational time of the machine prior to requiring the machine to be shut down and replacement of portions of the pressure pad assembly.

Referring to FIGURE 6, there is shown a pressure pad assembly generally indicated at 80 which is adapted to be used with a transducer head 82 and an information bearing document or card 86 as shown positioned between the transducer head 82 and the pressure pad assembly 80 with the card moving from right to left as indicated by the arrow. The pressure pad assembly 80 makes use of the same essential elements as does the pressure pad in the embodiment shown in FIGURE 1. There is provided a roller member 88 which is positioned within a V-block 90 such that there occurs contact of the roller member with the sides of the V-block at points 92 and 94. The V-block 90 is positioned within suitable support member 96 and biasing means such as spring 98 acts to bias the V-block 90 toward the transducer head 82. Unlike the previous embodiment, the roller 88 does not make direct contact with the transducer head or the non-continuous document.

A flexible belt member 100 is positioned upon a pair of idler members 102 mounted on either side of the V-block structure, the mounting means including biasing springs 104 or the like adapted to continuously keep a certain amount of tension within the belt member 100. The inner surface of the belt member 100 contacts the peripheral surface of roller 88 along a small portion of the roller surface immediately adjacent the transducer head 82. The coefficient of friction between the belt 100 and the peripheral surface 88 of the roller is of such a magnitude that any rotation of roller 88 will result in movement of the belt and there will occur no relative movement between these members under normal operation. It is important to note that the configuration of the idler rollers 102 and the position of the transducer head 82 and the roller 88 is such that the belt makes an angle $\beta$ with respect to a line drawn tangent to the roller 88 at the point of contact with transducer head 82.

It is apparent that the device will operate substantially identical to the FIGURE 1 embodiment and similar conditions will hold for achieving equilibrium operation wherein there will be no rotation of roller 88 within the sides of the V-block at contact points 92 and 94, except at the initial moment of impact of document 86 against the outer surface of the belt member 100 as the high velocity document 86 comes into contact with the belt member 100 and transducer head 82. At this instant, the roller 88 will slide or rotate slightly within the V-block and because of the high coefficient of friction between the peripheral surface of roller 88 and the inner surface of belt member 100, the belt member will move a slight distance with respect to the transducer head 82, thus presenting a new contact surface of belt member 100 for the pressure pad assembly. The advantage that the embodiment of FIGURE 6 has over the embodiment of FIGURE 1, is that by making use of an elongated belt member 100, for a given circumferential surface of roller 88, there will be provided a much greater contact surface for the pressure pad assembly because of the much greater surface length of the belt member 100. In all other respects, the apparatus of FIGURE 6 will operate in the same manner as the apparatus of FIGURE 1.

Figure 7:
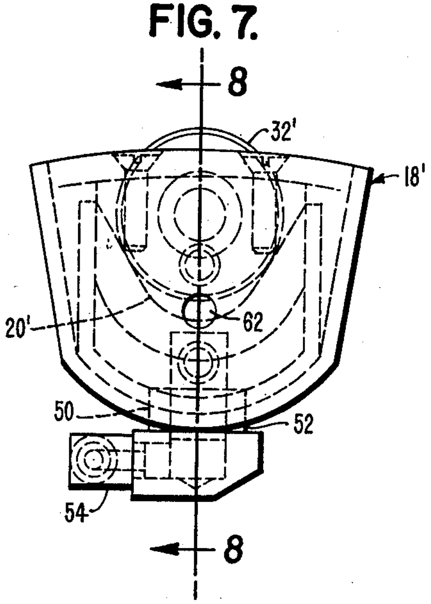
FIGURE 7 is a side elevation view of a practical embodiment of the pressure pad per se.
Figure 8:
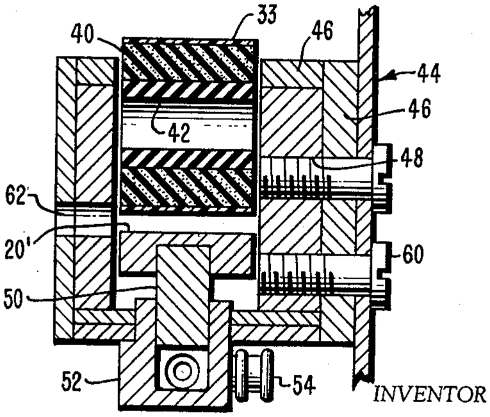
FIGURE 8 is a sectional view taken along line 8—8 of FIGURE 7.

The practical embodiment of the present invention, fashioned after the embodiment of FIGURE 1 is shown in FIGURES 7 and 8 which disclose a pressure pad assembly indicated generally at 18' including a roller member 32' which rests upon a generally V-shaped block member 20'. The roller 32' includes an outer shell 33 of Rulon which is a mixture of nylon and Teflon (polytetrafluoroethylene), the Rulon being utilized because due to the Teflon it does not pick up document dust or other foreign particles as does nylon alone, steel, etc. At the same time, the Rulon shell provides the required frictional characteristics to develop the necessary coefficient of friction between the roller and the elements with which it is in contact. The Rulon shell 33 is quite thin and a core 40 of foam rubber is provided between the Rulon shell and an inner cylinder 42 formed of some harder material such as hard rubber or phenolic plastic. The core 40 and inner cylinder 42 are nonmagnetic, while at the same time being somewhat resilient to absorb the impact shocks caused by the high velocity document making contact with the peripheral surface of the Rulon shell 33 when they start to pass between the pressure pad 18' and the magnetic transducer head. In order to suitably support the roller member 32' and bias the roller against the document, there is provided a support assembly 44 which consists primarily of laminated mu metal used as a protective means such that stray magnetic and electric fields will not interfere with the normal magnetic field functions of the transducer. To obtain optimum shielding properties, the support assembly is constructed of a laminate having alternate layer of mu metal and copper. The outer layer 46 comprises such a laminate, while the inner support layer 48 may be of some other metal such as brass, or a plastic material as desired. The inner and outer support assembly layers 48 and 46 are secured together by suitable means such as adhesive. Unlike the schematic biasing shown in FIGURES 1 and 2, this particular embodiment makes use of air pressure for providing the necessary biasing force tending to direct the roller against the surface of the moving documents and the transducer head. The V-shaped block member 20' is formed of a plastic material such as that commercially known by the trademark Elastacast which acts to satisfy the friction conditions between the roller and the V-block as well as providing a satisfactory apparatus to insure even wearing of the Rulon roller shell at a rate approximately $8\times10^{-6}$ inches per 100,000 document passes. Other materials may also be used such as soft aluminum which has the necesary characteristics. The V-shaped block member is attached to piston 50 which is vertically mounted for reciprocation within a cylinder member 52. The cylinder member 52 includes a laterally extending hollow coupling member 54 with the hollow coupling member adapted to receive air at suitable pressure to form a biasing means tending to move the block 20' and the roller 32' toward the face of the document.

Of particular advantage is the fact that air escaping or leaking past the piston 50 and moving up around the V-block 20, tends to force any document dust away from the pressure pad and the magnetic transducer head. In this respect, any document dust which may leak down past roller 32' may be carried out through exhaust opening 62 and discharged into the atmosphere away from the area of contact between the roller and the document. Thus, the apparatus is self-cleaning and this feature is particularly advantageous in data processing equipment operating on large numbers of individual documents in a short time with the impact of the document contacting the pressure pad and the transducer head normally resulting in the formation of a relatively large amount of document dust. With the present trend to word miniaturization of transducer heads and pickup apparatus in general, the use of air pressure as a biasing and cleaning means is particularly advantageous. The elimination of coil springs or other mechanical biasing means has advantages which are readily apparent when contrasted to the use of air pressure for providing the dual function with a reduction in both space and cost.

While there have been shown and described, and pointed out the fundamental novel features of this invention as applied to the preferred embodiment, it will be understood that various omissions and substitutions and changes in the form and details of the device illustrated in its operation may be made by those skilled in the art without departing from the spirit of the invention. It is the intention therefore to be limited only as indicated by the scope of the following claims.

What is claimed is:

1. A wear resistant pressure pad for use with a transducer head adapted to momentarily contact, in sequence, a plurality of spaced, information bearing documents moving linearly at high velocity past said head, said pressure pad comprising; a block member positioned adjacent said transducer head, said block member including a V-shaped recess formed on the surface thereof facing said head, means supporting said block member for movement toward and away from said head, a cylindrical roller positioned within said V-shaped recess and having line contact with each side of said V-shaped recess and said transducer head, and means biasing said block toward said transducer head whereby said pressure pad contacts the transducer head along the same line of contact regardless of the amount of roller wear, and wherein the rotation resisting effect of the frictional forces exerted between the roller and the sides of said V-shaped recess is greater than that of the frictional forces between said roller and said information bearing documents normally causing said documents to slide on said roller as said documents are moving past said transducer head, except at the initial time of impact of said documents with said roller and said transducer head, when said roller rotates slightly with each of said documents.

2. The combination as defined in claim 1 further comprising gas under pressure acting as the biasing means, and means allowing leakage gas to be directed toward the rotatable member to keep the pressure pad free of document dust.

3. A wear resistant pressure pad for use with a transducer head adapted to momentarily contact, in sequence, the plurality of spaced, individual information bearing documents moving linearly at high velocity past said transducer head, said pressure pad comprising: a block member positioned adjacent said transducer head, means supporting said block member for lateral movement toward and away from said head, said block member including a V-shaped recess formed on the forward surface thereof facing said head, a roller positioned within said V-shaped recess, means biasing said block member toward said transducer head, whereby said pressure pad contacts said transducer head along the same line of contact regardless of the size of said roller or the amount of roller wear.

4. A wear resistant pressure pad for use with a transducer head adapted to momentarily contact, in sequence, a plurality of spaced, information bearing documents moving linearly at high velocity past said head, said pressure pad comprising: a block member positioned adjacent said transducer head, means for supporting said block member for lateral movement toward and away from said head, said block member including a V-shaped recess formed on the surface thereof facing said head, a roller positioned within said V-shaped recess, means biasing said block member toward said transducer head, said line of contact between said roller and said transducer head forming frictional angles $\delta_1$ between said roller and said transducer head, and $\delta_2$ between said roller and the sides of said V-shaped recess, an angle $\alpha_1$ being formed between a line extending along the side of said V-shaped recess remote from the line of entry of said moving document and a line drawn tangent to said roller at the line of contact of said roller with said transducer head, and an angle $\alpha_2$ being formed between a line extending along said other side of said V-shaped recess and said tangent, said apparatus so constructed as to satisfy the following condition:

$$\frac{\sin \delta_1}{\sin \delta_2}=\frac{\cos\left(\delta_1+\delta_2+\frac{\alpha_2-\alpha_1}{2}\right)}{\cos\left(\frac{\alpha_1+\alpha_2}{2}\right)}$$

5. Apparatus as claimed in claim 4 further including means for supporting said block member at an angle $\theta$ with respect to a line drawn perpendicular to the contact face of said magnetic head, said block member being tilted away from the direction of entry of said moving document thereby forming an angle $\theta$ between a line drawn from the apex of the V block to the contact point of the roller and transducer head and said perpendicular line, said pressure pad assembly so positioned with respect to said transducer head as to satisfy the further condition that:

$$\tan \theta=\frac{\tan\left(\frac{\alpha_1+\alpha_2}{2}\right)-\tan \alpha_2}{\frac{1}{\cos \alpha_2}+1+\tan\left(\frac{\alpha_1+\alpha_2}{2}\right)\tan \alpha_2}$$

6. A wear resistant pressure pad for use with a transducer head adapted to momentarily contact in sequence a plurality of individual, spaced, information bearing documents, moving linearly at high velocity past said transducer head, said pressure pad comprising: a roller member adapted to contact the surface of said transducer head or said moving document, at least the outer peripheral surface of said roller member containing a substantial amount of polytetrafluoro ethylene, a generally V-shaped block member positioned on the side of said roller member away from said transducer head, said V-shaped block member being formed of plastic material, means for supporting said V-shaped block member and allowing said V-shaped block member and said roller to move laterally away from the surface of said transducer head, a piston member rigidly mounted on the rear of said V-shaped block member, a cylinder surrounding said piston member, and means for supplying air pressure to said cylinder to bias said piston and said V-shaped block toward said transducer head.

7. Apparatus as claimed in claim 6 further including a casing member surrounding said pressure pad, said casing including an outer surface layer of mu metal.

8. Apparatus as claimed in claim 6 further including means for directing a portion of the high pressure air toward the surface of said transducer head, said means acting to blow away the document dust in the vicinity of the pressure pad and transducer head.

9. A wear resistant pressure pad to be used with a transducer head adapted momentarily to contact in sequence, a plurality of individual, spaced, information bearing documents moving linearly at high velocity past said transducer head, said pressure pad comprising: a generally cup-shaped casing including an open forward end, said casing member being provided with an outer surface of mu metal, means forming a cylinder within the rear of said casing member with the axis of said cylinder being directed toward the open end of said casing member, a piston positioned within said cylinder and adapted to reciprocate therein, a V-shaped block member rigidly coupled to the forward end of said piston, said V-shaped block member having its concave face directed forwardly toward the open end of said casing member, a roller member positioned within said V-shaped block member, surrounded by said casing member except for the open forward end thereof and means for directing high pressure air against the inner end of said piston to cause said V-shaped block to bias said roller against said transducer head.

10. Apparatus as claimed in claim 9 including means for allowing some of the high pressure air to escape from said cylinder around said piston and out of said open end of said casing, causing any document dust to be blown away from the line of contact between said transducer head and said pressure pad.

11. Apparatus as claimed in claim 9 wherein said V-shaped block member is composed of a plastic material and said roller member has at least the outer peripheral surface formed of Rulon.

12. Apparatus as claimed in claim 9 wherein said V-shaped block member is composed of aluminum and said roller has at least the outer peripheral surface formed of a plastic material including some polytetrafluoro ethylene.

13. A wear resistant pressure pad for use with a magnetic transducer forcing each of a plurality of magnetically recorded documents rapidly fed between the transducer and pressure pad against the transducer at a single contact area, the pressure pad comprising; a roller member in operable relationship with said documents to force each of the documents against the transducer at the contact area, block means having a V-shaped recess therein mounting said roller member within said recess for movement toward and away from the transducer, means biasing said block means and thereby said roller member toward said transducer, friction means acting upon the roller member remote from the contact area to retard rotation thereof, a flexible belt member positioned between said roller member and said transducer, the coefficient of friction between said belt member and said roller member being such that there is no relative movement between said elements as said roller member rotates with respect to said stationary transducer head, the physical parameters including coefficients of friction and friction angles of the moving documents, roller member and the friction means being such that at initial impact of the leading edge of the document, the roller member overcomes the retarding force of the friction means and after the initial impact, the friction means retarding force stops rotation of the roller member, whereby due to natural attrition the belt member will wear evenly and the area of contact will remain in the same place with regard to the transducer.

14. A wear resistant pressure pad for use with a transducer head adapted momentarily to contact, in sequence, a plurality of spaced information bearing documents moving linearly at high velocity past said head, said pressure pad comprising; a block member positioned adjacent said transducer head, means for supporting said block for movement toward and away from said head, said block member including a V-shaped recess formed on the surface thereof facing said head, a cylindrical roller positioned within said V-shaped recess and having line contact with each side of said V-shaped recess, an endless belt member positioned between said roller and said transducer head with the coefficient of friction between said belt member and said roller being of such a magnitude as to prevent relative movement between said elements as said roller rotates, and means biasing said block toward said transducer whereby said belt member contacts the transducer head along the same line of contact regardless of the amount of belt wear.

15. Apparatus as claimed in claim 14 wherein the rotation resisting effect of the frictional forces exerted between the roller and sides of the V-shaped recess is greater than that of the frictional forces between the roller, said belt member and said information bearing document normally causing said documents to slide on said belt as said documents are moving past said transducer head, except at the initial time of impact of said documents with said belt member and said trandsucer head whereby said roller and said belt rotate slightly with each of said documents.

16. A wear resistant pressure pad for use with a transducer head adapted to momentarily contact, in sequence, a plurality of spaced, information bearing documents moving linearly at high velocity past said head, said pressure pad comprising; a block member positioned adjacent said transducer head, means for supporting said block member for movement toward and away from said head, said block member including a V-shaped recess formed on the surface thereof facing said head, a cylindrical roller positioned within said V-shaped recess having line contact with each side of the V-shaped recess, means biasing said block towards said transducer head, a pair of idler members positioned on either side of said movable block member, an endless belt mounted on said idler members and adapted to pass between said cylindrical roller and said transducer head, the coefficient of friction between said cylindrical roller and belt member being of such a magnitude that there is no relative movement between said belt member and said cylindrical roller during rotation of said cylindrical roller and means for intermittently rotating said belt and said cylindrical member to provide a new belt contact surface area at the point where said belt contacts said transducer head.

References Cited in the file of this patent

UNITED STATES PATENTS

| | | |
|---|---|---|
| 2,677,200 | MacChesney | May 4, 1954 |
| 2,880,997 | Brown | Apr. 7, 1959 |

FOREIGN PATENTS

| | | |
|---|---|---|
| 559,159 | Italy | Mar. 15, 1957 |